May 30, 1961 L. G. BREEN ET AL 2,985,978
ADVERTISING DISPLAYS
Filed Dec. 24, 1956 3 Sheets-Sheet 1
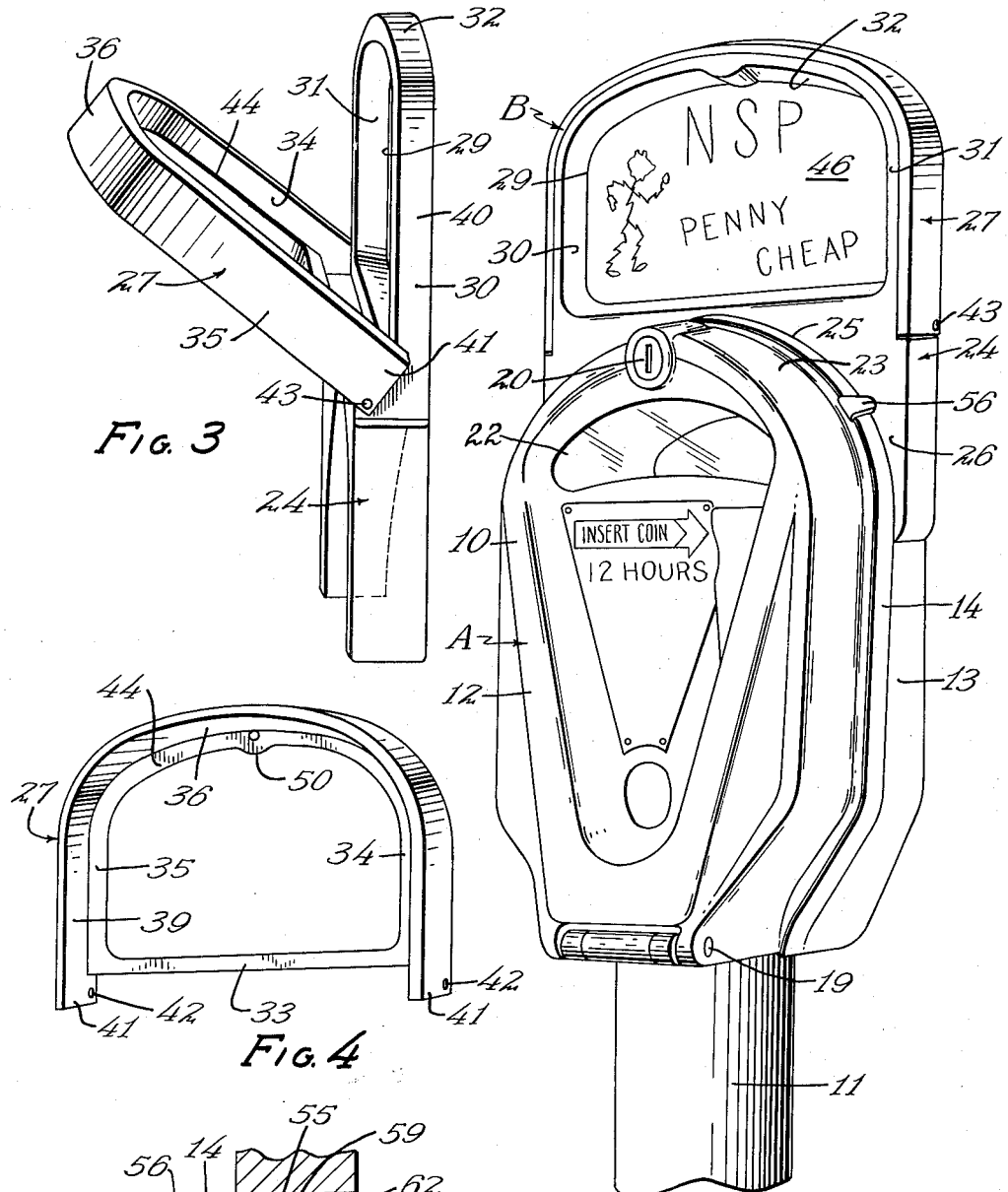
INVENTORS
Leonard G. Breen
Dennis W. Hansen
Engelbert J. Peham
BY 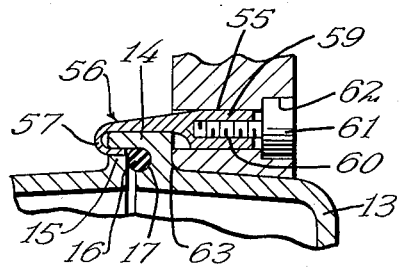
ATTORNEY

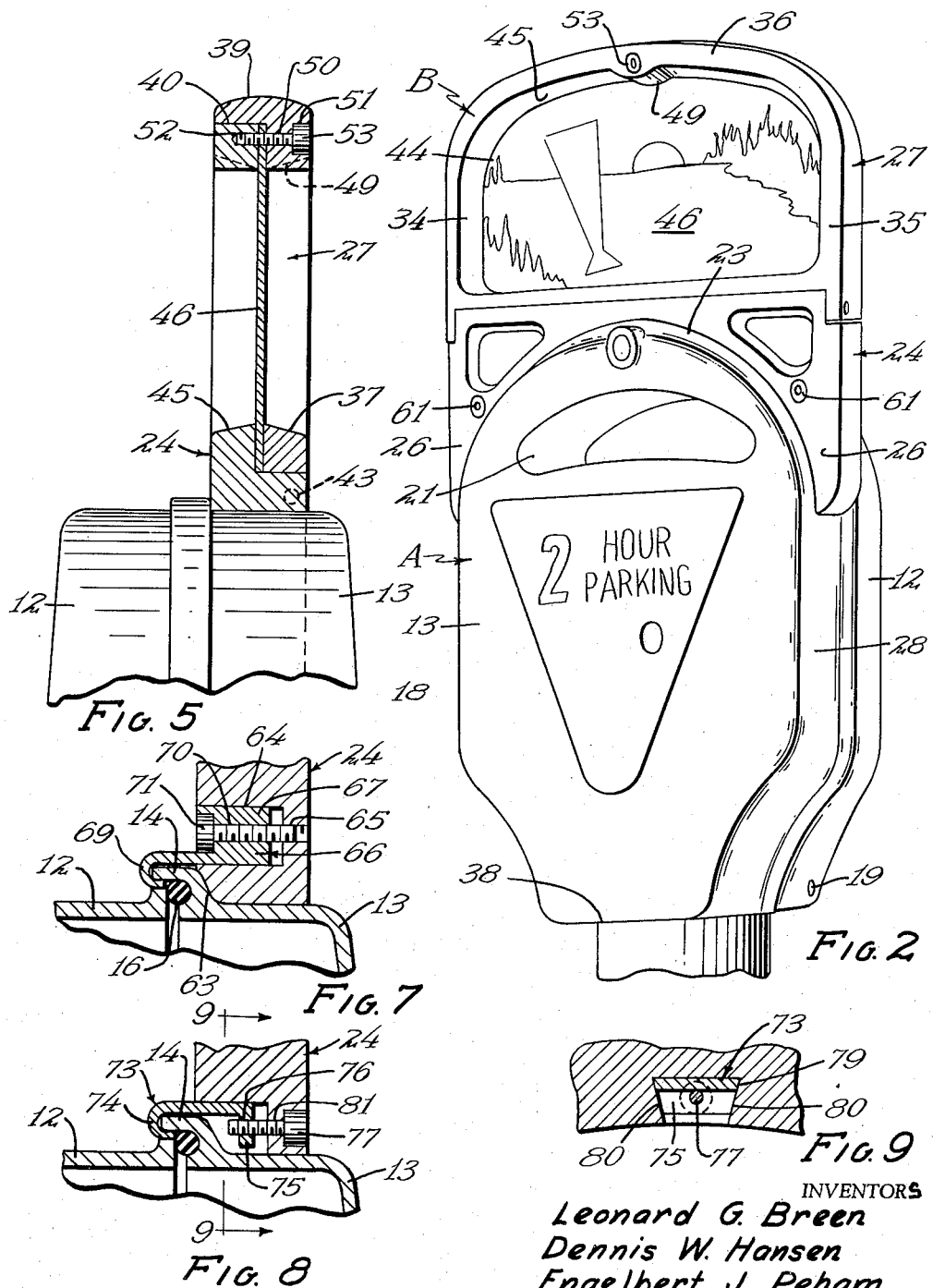

May 30, 1961

L. G. BREEN ET AL 2,985,978

ADVERTISING DISPLAYS

Filed Dec. 24, 1956

INVENTORS
Leonard G. Breen
Dennis W. Hansen
Engelbert J. Peham
BY Robertson Dunning
ATTORNEY

United States Patent Office 2,985,978
Patented May 30, 1961

2,985,978
ADVERTISING DISPLAYS

Leonard G. Breen, 1156 Supornic Lane, St. Paul 6, Minn.;
Dennis W. Hansen, 2808 N. Lakeview, St. Paul 13,
Minn.; and Engelbert J. Peham, 1302 Eleanor Ave.,
St. Paul 17, Minn.

Filed Dec. 24, 1956, Ser. No. 630,185

6 Claims. (Cl. 40—333)

This invention relates to an improvement in advertising displays and deals particularly with a display designed to be mounted upon a parking meter or the like.

During recent years, the use of parking meters has become extremely popular as a means of eliminating overtime parking and providing an additional source of revenue for a city or town. While these meters vary somewhat in design and style, most such meters include a casing or housing made in two main parts which are separable along a generally vertical plane. As meters of this type must be weather proof, it is usual practice to provide a lip or flange on one of the casing parts which overlaps a portion of the marginal edge of the other part. A sealing gasket is provided between the parts to make the casing weather tight.

An object of the present invention lies in taking advantage of this general type of construction for securing the advertising display in place.

A feature of the present invention lies in the provision of a display which comprises a frame mounted upon the top of a parking meter or the like and which in preferred form has openings on both sides thereof. As a result, two advertisements may be simultaneously displayed if desired, one of which is visible from each side of the meter.

A further feature of the present invention lies in the fact that the meter itself does not have to be changed or modified in order to support the display. This fact is of extreme importance for in some instances the changing or modification of the meters is prohibited and as in other instances the owners of the meters are reluctant to permit any attachment to the meters which will permanently change the meters in any way or leave openings or holes in the casing in the event the display is removed.

A further feature of the present invention lies in the simplicity with which the advertisements may be replaced or changed. The advertising display is preferably made of two main parts which are hnigedly connected together and the parts may be hinged apart to accommodate the advertisement therebetween. As a result, the advertisements may be changed at regular intervals if desired without in any way affecting the parking meters themselves.

A feature of the present invention resides in the fact that it is not necessary to open the parking meter in order to attach or detach the advertising display or to change the advertisement or advertisements supported thereby. This is particularly important where the operation of the meters themselves is under the control and jurisdiction of a part of the city government while the attachment and detachment of the advertising displays and the changing of the material displayed may be controlled by an advertising concern or the like who merely pay for the right to attach the advertising displays to the meters.

A further feature of the present invention resides in the provision of an advertising display which is rugged in character and is capable of withstanding the strains and shocks to which a device of this type may subjected. At the same time, the displays are such that they may be produced at low cost so that the investment involved is not excessive.

A further feature of the present invention resides in the provision of a specific manner of attaching the display so that it will remain firmly in place. Most parking meters and similar objects are provided with a rounded upper portion or at least rounded edges adjoining the top of the casing. Fastening means are provided to connect the display to curved portions of the marginal flange on one casing part which is designed to overlap the edge of the other casing part. By locating the fastening means in this manner, the display is held from movement in any direction.

These and other objects and novel features of the present invention will be more clearly and fully set forth in the following specification and claims.

In the drawings forming a part of the specification:

Figure 1 is a perspective view of one side of a parking meter showing the advertising display mounted thereupon.

Figure 2 is a view similar to Figure 1 showing the reverse side of the display and parking meter from that shown in Figure 1.

Figure 3 is a perspective view of the advertising display in opened position or in position to receive advertisements.

Figure 4 is a perspective view of the swingable portion of the display detached from the remainder thereof.

Figure 5 is a sectional view arranged on a vertical plane through the center of the advertising display.

Figure 6 is a sectional view through a portion of the parking meter casing and through one of the fastening means for fastening the display in place upon the meter.

Figure 7 is a view similar to Figure 6 showing a modified form of construction of attaching means.

Figure 8 is a view similar to Figures 6 and 7 but showing another modified form of fastener for attaching the display to the meter.

Figure 9 is a cross sectional view through a portion of the attachment shown in Figure 8, the position of the section being indicated by the line 9—9 of Figure 8.

Figure 10:
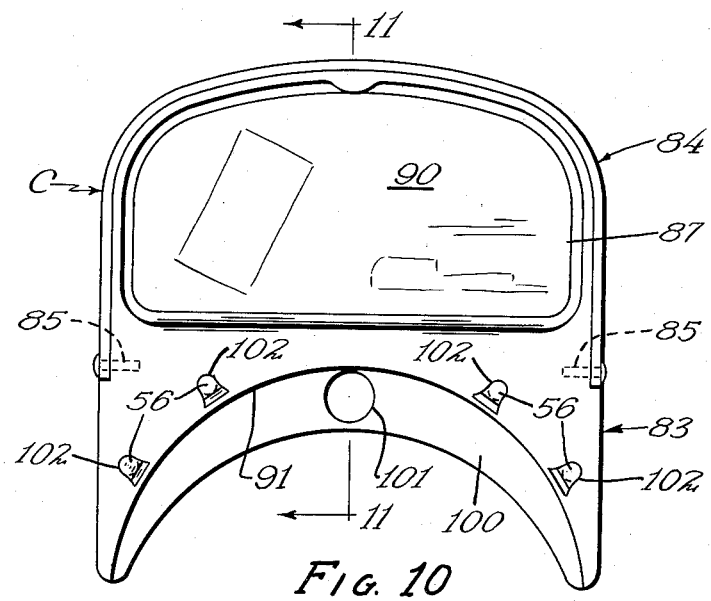
Figure 10 is an elevation view of a modified form of construction of advertising display.

Parking meters, such as the meter A illustrated in the drawings may vary substantially in their specific form and design. Usually, however, such parking meters include a housing 10 which is mounted upon the upper extremity of a supporting post 11. In general, the casing 10 is usually made up of two main parts, one part 12 usually forming the inwardly facing side of the meter and supported to face the sidewalk, and a cooperable side 13 which normally forms the outer side and which is designed to be directed toward the street.

The two housing sections 12 and 13 are designed to fit together with a water proof joint. In order to accomplish this result, the outer section 13 is provided with an offset peripheral flange 14 which is designed to overlap a marginal portion of the section 12. The section 12 is provided with a short outwardly directed peripheral flange 15 which terminates inwardly of the flange 14 and a sealing gasket 16 is supported in a marginal groove 17 between the offset flange 14 and the remainder of the shell of section 13 to provide a weather tight joint between the two sections. The two sections are held together in any suitable manner, as for example by aligned pivots 19 near the lower end of the inner section 12 so that this inner section may be swung inwardly on a generally horizontal pivot to gain access to the interior of the meter housing. A suitable locking mechanism such as 20 is provided for holding the sections from normal separation.

The inner and outer sections 12 and 13 are provided with windows 21 and 22 through which a meter hand or indicator hand which designates the amount of remaining time for parking at the meter and for observing an indication device which designates when the meter time has elapsed.

In the particular form of construction illustrated, the housing of the meter A is provided with a rounded upper surface 23 which merge into generally parallel sides which are connected by a generally horizontal bottom portion. Obviously, however, the meters vary somewhat in shape and design and some meters are produced which are substantially flat on top but which are connected by rounded upper corners to the parallel sides. In view of the fact that the number of designs of such devices is relatively small, it is possible and practical to design an advertising display which will fit the contour of each form of meter construction. As each model of meter is manufactured in considerable volume, a single shape of advertising display will fit an extremely large number of meters.

The advertising display which forms the basis of the present invention is indicated in general by the letter B. The display B is designed to fit the upper surface of the meter A and accordingly, in the particular arrangement illustrated, the display includes an upright frame member 24 having a curved under surface 25 designed to snugly fit the upper surface of the outer casing member 13. The sides 26 of the frame 24 extend down the sides of the meter housing to lie outwardly of the upper ends of the parallel sides of the casing. Thus, the frame 24 forms an upward projection from the outer casing member 13 and is held in this position in a manner which will be later described in detail.

The advertising display B is formed of two main parts, one of which comprises the frame 24 and the other of which comprises a hingedly supported frame member 27. The frame member 24 includes a transversely elongated window opening 29 which is defined by generally parallel upwardly extending frame sides 30 and 31 and a transversely extending frame top 32. In the particular arrangement illustrated, the frame top 32 is upwardly bowed so as to blend more effectively with the contour of the meter housing. The inner surfaces of the frame sides 30 and 31 as well as the frame top 32 are inwardly beveled so as to provide a more attractive frame when viewed from the inner or sidewalk side of the display.

The hinged portion 27 of the display is best illustrated in Figures 3 to 5 of the drawings and includes a lower transverse frame member 33, upwardly extending frame sides 34 and 35 and a frame top member 36. The inner surfaces of these frame sides are beveled as is indicated at 37 in Figure 5 of the drawings. The frame sides 34 and 35 and frame top 36 are provided with a forwardly projecting flange 39 which encloses the outer surfaces 40 of the corresponding sides of the fixed frame member 24. Ears 41 form a continuation of the flange 39 and the outer portions of the frame sides 34 and 35 and project downwardly below the level of the bottom frame side 33. The ears 41 are provided with aligned apertures 42 designed to accommodate pivots 43 which extend into opposite sides of the frame member 24 to hingedly connect the pivoted frame member 27 to the fixed frame member 24.

Thus, it will be seen that both the fixed frame member 24 and the hinged frame member 27 is provided with a window opening, the window opening in the fixed frame member being indicated by the numeral 29 and the corresponding window in the pivoted frame member 27 being indicated by the numeral 44. Both window openings are similar in shape and the edges of the frame parts encircling the window openings are oppositely beveled as indicated at 37 and 45. The inner surfaces of the fixed frame member and of the pivotal frame member are slightly spaced to accommodate a display advertisement 46 therebetween. In actual practice, this display member 46 may comprise a central rigid panel and advertising panels on opposite sides of the central panel. However, the particular form and arrangement of the display panels may be varied depending upon whether these panels are to remain in use over a long period of time or are designed to be in service only a short period of time.

As is indicated in Figure 2 of the drawings, the top member 36 of the hinged frame member 27 is provided with a central boss or enlargement 49 which is provided with an aperture 50 extending therethrough and preferably having an enlarged diameter recess 51 at its outer extremity. As may be seen in Figure 5 of the drawings, the upper frame member 32 of the fixed frame 24 is provided with a threaded aperture 52 which is axially aligned with the apertures 50 and 51. A clamping bolt 53 is designed to extend through the aperture 50 and this bolt is threaded into the threaded aperture 52 of the fixed frame member 24. The head of the bolt 53 is preferably recessed into the enlarged diameter aperture 51 to prevent the bolt from projecting outwardly from the hinged frame.

The manner in which the fixed frame member 24 is secured in place upon the meter A is best illustrated in Figure 6 of the drawings. Two or more apertures 55 extend through the fixed frame member 24 in equally spaced relation from the periphery of the meter casing. Clamping means indicated in general by the numeral 56 are slidably supported in the apertures 55. The clamping means 56 includes a flattened inner end which is bent into a hook shaped formation as indicated at 57 to hook over the free edge of the offset flange 14 on the meter casing member 13. The clamping members 56 are provided with shanks 59 which are slidable in the apertures 55 and these shanks 59 are axially socketed as indicated at 60. Bolts 61 extend into the internally threaded sockets 60 to draw the hook shaped ends 57 of the clamping element over the free edge of the flange 14. If desired, the head of the bolts 61 may be recessed into counter-sunk openings such as 62.

As is indicated in Figure 2 of the drawings, the clamping members and their aligned bolts 61 are adjacent to curved portions of the curved frame surface 25 so that the hook ends 57 of the two clamping members are angularly related. This is important as the structure prevents movement of the advertising display relative to the meter housing in any direction. As the clamping bolts 61 are tightened, they draw the body of the frame member 24 against the shoulder 63 between the offset flange 14 and the remainder of the housing portion 13. This prevents movement of the fixed frame member 24 either in a forward direction or in a rearward direction. As the clamping members 56 engage the flange 14 on opposite sides of the center thereof and substantially below the top of the meter housing, the clamping members prevent the advertising display from tilting relative to the meter housing. Furthermore, as the sides 26 of the frame member 24 extend to the parallel sides of the meter housing, the advertising display cannot rotate about the center of arcuation of the top of the meter housing. As a result, two such clamping means 56 are all that are normally required to hold the advertising display firmly in position.

In Figure 7 of the drawings, we disclose a modified form of clamping means which may be substituted for the clamping members 56 shown in Figure 6. In this form of construction, the fixed frame member 24 of the advertising display is provided with relatively large diameter apertures 64 extending partially through the frame member 24 from the forward surface thereof, and relatively smaller internally threaded apertures 65 extending in coaxila relation to the aperture 64 and at the base thereof. The clamping members 66 may comprise cylindrical portions 67 having hook shaped projections 69 extending from the forward end thereof. The cylindrical members 67 are slidable in the aperture 64 and are axially apertured as indicated at 70 to accommodate a clamping screw 71 which extends through the aperture 70 and is threaded into the internally threaded aperture 65. By tightening the clamping bolt 71 of each clamping member, the hook shape projections 69 may draw the fixed frame part 24 of the advertising display against the shoulder 63 of the meter housing, the clamping members 66 thus performing the same duty as the clamping members 56 previously described.

In Figure 8 of the drawings another slightly different form of clamping means is illustrated. The clamping means 73 comprises a flat strip of material having a hook shaped extremity 74 at one end thereof and an angularly turned flange 75 at the other end thereof. The flange 75 is provided with an internally threaded aperture 76 to accommodate a clamping bolt 77. As is indicated in Figure 9 of the drawings, the clamping member 73 is slidably supported in a groove 79 in the inner surface of the fixed frame member 24 which extends partially through the frame member 24 from the forward surface thereof. As is indicated in Figure 9, the side edges 80 of the groove 79 are downwardly and inwardly tapered so as to hold the clamping member 73 to the base of the groove 79. Alternatively, the groove may have an undercut bottom portion if preferred. The clamping bolt 77 extends through an aperture 81 outwardly of the groove 79 so that the clamping member 73 may be moved longitudinally into or out of engagement with the offset flange 14 on the outer section 13 of the meter casing.

Figure 11:
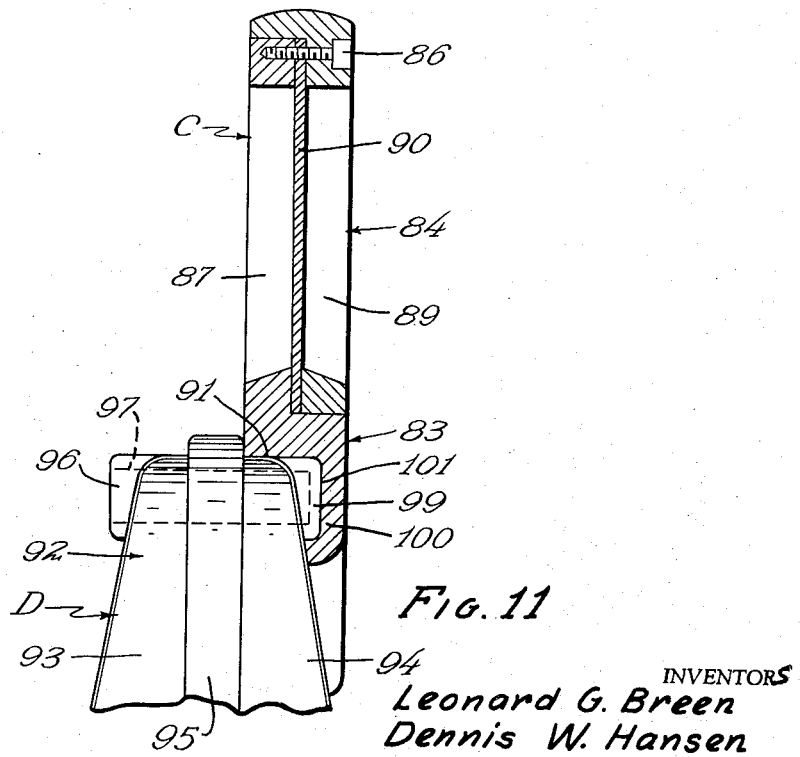
Figure 11 is a sectional view through the display shown in Figure 10, the position of the section being indicated by the line 11—11 of Figure 10.

Figures 10 and 11 of the drawings discloses a different type of display construction, shown in general by the letter C. This display C is designed to fit a slightly different form of meter D from that shown at A in the previous views.

In general, the displays B and C are identical. The display C is made of a main frame 83 which corresponds to the frame member 24, and an auxiliary hinged frame 84 which is identical to the hinged frame member 27. The two frame members 83 and 84 are connected by aligned pivots 85, and normally held in parallel relation by a clamping bolt 86. The frame members 83 and 84 include registering windows 87 and 89. As the upper portion of the frame 83 is identical with the upper portion of the frame 24 and as the hinged frames 27 and 84 are identical, the manner in which the displays 90 are held is believed obvious.

The main frame 83 is provided with a curved under surface 91 to fit the curvature of the top of the meter housing 92 of the meter D. As shown in Figure 11, the meter housing 92 is narrower in thickness near its upper periphery, and is formed of two sections 93 and 94, the outer of which is provided with an offset flange 95 similar to the flange 14. A central boss 96 on the section 93 accommodates a locking mechanism 97 which extends into an oppositely directed boss 99 on the housing section 94. This construction permits an additional reinforcing flange to be added to the main frame as will be described.

As shown in Figure 10, a flange 100 extends downwardly from the curved frame edge 91, this flange 100 being shaped to fit the contour of the outer surface of the housing section 94. The flange 100 is shown as being generally crescent-shaped, and acts to reinforce the connection between the meter and the display. A generally cylindrical recess 101 is provided in the center of the flange 100, so as to fit snugly about the boss 99. As the end of the boss 99 is thus enclosed, or substantially enclosed, movement of the display in any direction other than axially of the boss 99 is prevented.

A series of angularly spaced apertures 102 are provided in the main frame member 83 near the curved under surface 91 to accommodate clamping means 56 or the other forms of clamping means shown. Four such clamping means are shown in Figure 10; but this is purely a matter of choice and to show that in any form of construction the number of clamps may be varied, although two such members properly positioned, accomplish the desired result.

In accordance with the patent statutes we have described the principles of construction and operation of our advertising display, and while we have endeavored to set forth the best embodiments thereof, we desire to have it understood that obvious changes may be made within the scope of the following claims without departing from the spirit of our invention.

We claim:

1. An advertising display for use in conjunction with a two part casing including a pair of edge abutting sections, one of which includes an outwardly offset flange overlapping the marginal edge of the other part, the display including a main display frame having a lower surface shaped to fit the contour of the housing adjacent to the offset flange thereon, and including clamping means slidably supported by said main frame at locations spaced somewhat above said lower surface and including hook ends engageable over the edge of the offset flange of the housing and means for moving said clamping means relative to the main frame for clamping the main frame against the end of the offset flange opposite that over which said hook ends of said clamping members engage.

2. An advertising display for use in combination with a two part housing, the housing including a pair of sections arranged in edge abutting relation, one of said sections having an offset flange connected marginally thereto providing a peripheral shoulder, said flange having a free edge overlapping the edge of the other of said sections, the display including a main display frame having a lower surface shaped to fit the contour of said one section adjacent to said shoulder, and including clamping means extending through said main frame at a height slightly above said lower surface and extending over said flange, said clamping means including hook elements designed to engage over the free edge of said flange, and means for moving said clamping members relative to said frame to clamp said frame against said shoulder.

3. The construction described in claim 2 and in which said clamping means include an internally threaded socket and in which said means for clamping said frame against said shoulder comprises threaded elements engaged in said sockets.

4. The construction described in claim 2 and in which said means for drawing said frame against said shoulder comprises clamping bolts extending through said clamping means and are threaded into said frame.

5. The construction described in claim 2 and in which said clamping members are slidable in grooves in the lower marginal edge of said frame.

6. The structure of claim 2 and in which the meter housing includes a generally vertical surface on said one housing section having a boss projecting therefrom, and including a flange on said main display frame overlying a portion of said generally vertical surface and including a recess into which said boss extends.

References Cited in the file of this patent

UNITED STATES PATENTS

| | | |
|---|---|---|
| D. 152,294 | Siegel | Jan. 4, 1949 |
| 1,520,455 | Terwillinger | Dec. 23, 1924 |
| 1,767,746 | Elze | June 24, 1930 |
| 1,841,204 | Overholtz | Jan. 12, 1932 |
| 2,572,174 | McKenzie | Oct. 23, 1951 |
| 2,625,761 | Thompson | Jan. 20, 1953 |
| 2,775,221 | Olson | Dec. 25, 1956 |
| 2,798,325 | Wilson | July 9, 1957 |